July 1, 1941.  J. MASSOLLE  2,247,783
MACHINE FOR THE PRODUCTION OF ALTERNATING ENERGY
FROM DIRECT CURRENT SOURCES
Filed May 4, 1938  3 Sheets-Sheet 2
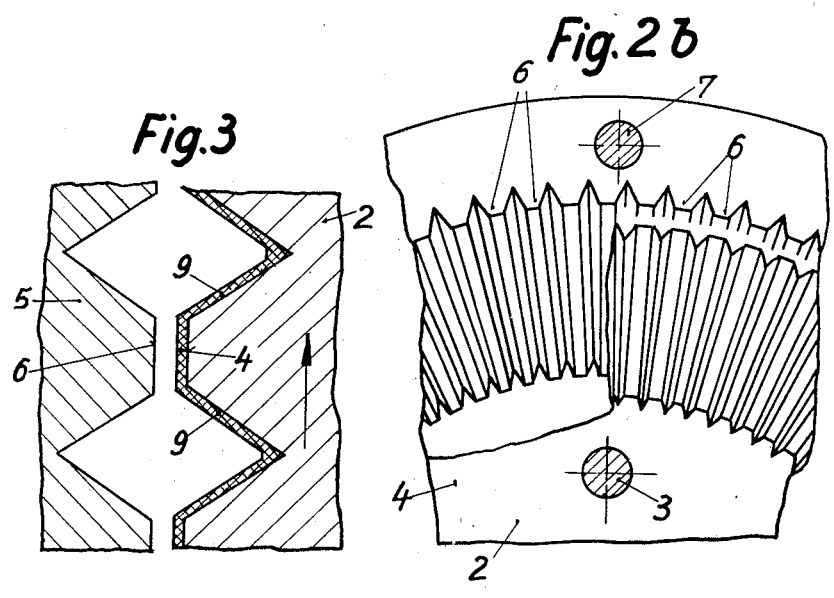
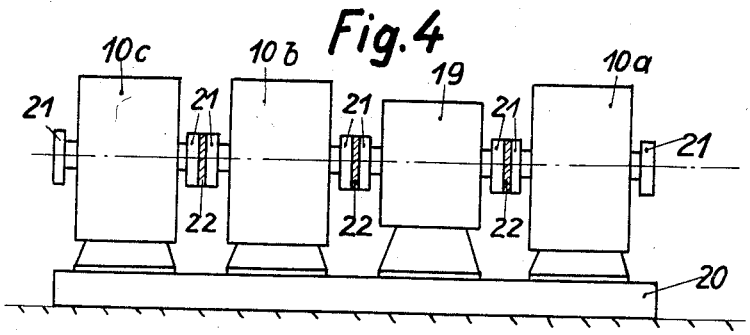
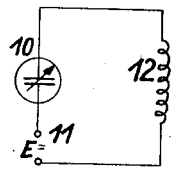
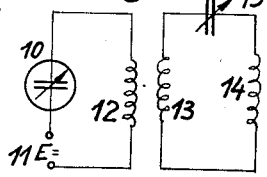
Inventor:
Joseph MASSOLLE
by [signature]
his Attorney July 1, 1941.                J. MASSOLLE                 2,247,783
        MACHINE FOR THE PRODUCTION OF ALTERNATING ENERGY
                    FROM DIRECT CURRENT SOURCES
               Filed May 4, 1938           3 Sheets-Sheet 3
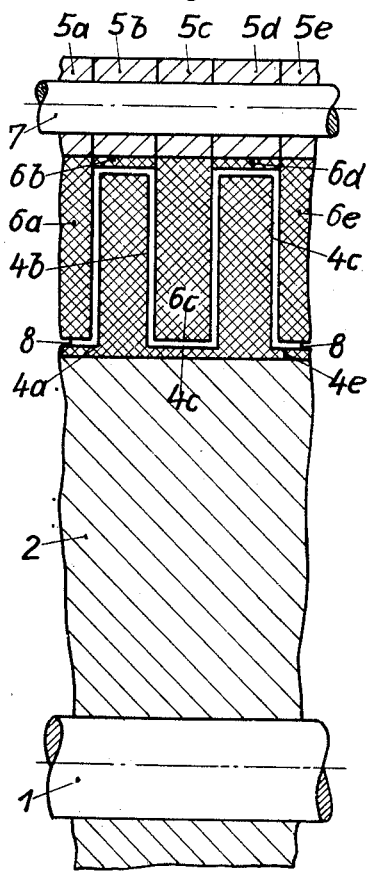
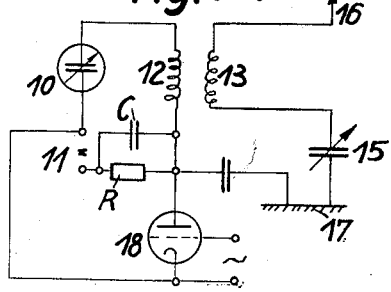
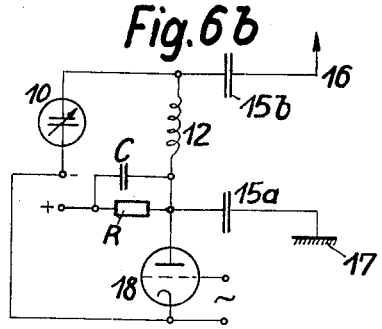
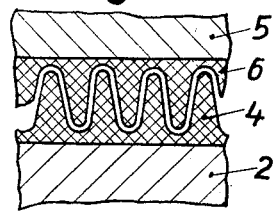
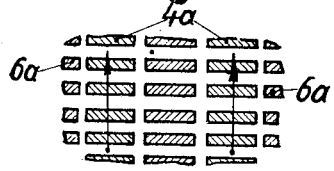
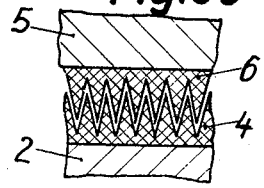
Inventor:
Joseph MASSOLLE
by *his Attorney*

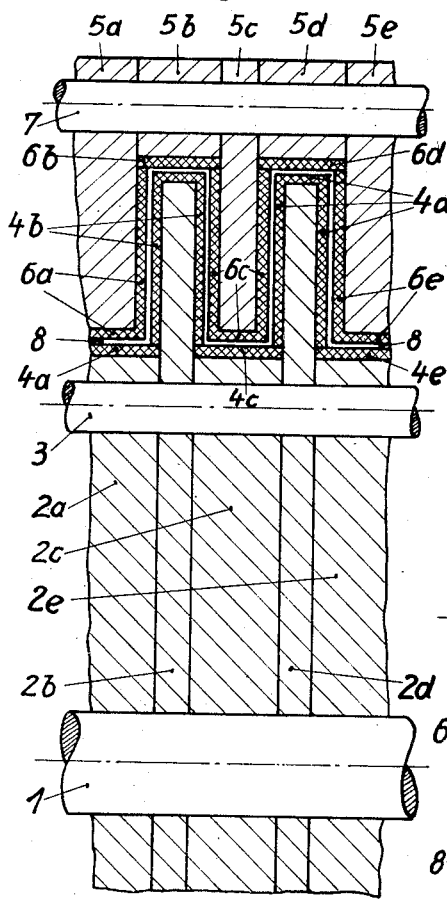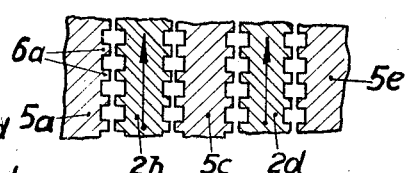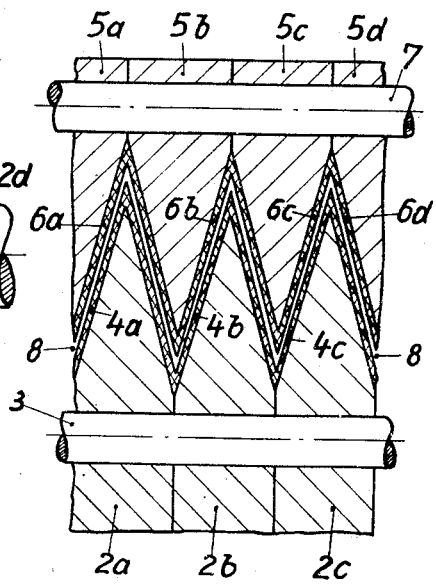

Patented July 1, 1941

2,247,783

UNITED STATES PATENT OFFICE 2,247,783

MACHINE FOR THE PRODUCTION OF ALTERNATING ENERGY FROM DIRECT CURRENT SOURCES

Joseph Massolle, Gross-Glienicke, Post Cladow, Germany

Application May 4, 1938, Serial No. 205,885
In Austria May 8, 1937

1 Claim. (Cl. 175—363)

This invention relates to machines for producing alternating voltage or current from a direct current source. By means of a machine of periodically varying capacity an alternating current or potential can be produced from a direct voltage by connecting the machine of variable capacity to a direct voltage source.

In such a machine the rotor may be provided on its periphery with longitudinal grooves forming teeth extending parallel to the axis of rotation and arranged opposite correspondingly formed teeth on the inner and adjacent surface of the stator. Upon rotation of such a rotor the capacity varies periodically and produces a charging current of alternating direction, from which may be derived an alternating voltage. The alternating voltage thus produced may then be applied to an amplifier.

In another arrangement sector shaped plates may be disposed axially along a rotatable shaft and moved between suitably formed stator plates. In this case also a charging current alternating in direction, is produced. However, owing to the construction of the movable parts the periodicity is of a low frequency.

In the machine according to the invention the rotor and stator consist of toothed discs or circular annuli disposed along the rotor axis and interengaging laterally in such manner that the annular toothed surfaces are disposed adjacent one another. The output of a machine according to the invention is substantially greater than that obtainable from an amplifier arrangement; for example it is sufficient for technical purposes, for example for the heating or for the operation of wireless transmitters.

In devices of this type in which discs of large superficial area are rotatably disposed between corresponding discs in the stator, only low frequencies can be produced, because the mechanical construction of the rotor does not permit of high speeds of rotation. Moreover, at a given speed of rotation the alternating frequency is very low; in a machine according to the invention a considerably higher frequency is produced at the same speed owing to the provision of toothed annuli on the periphery of the rotor and stator. The frequency is an important factor in the employment of a machine according to the invention for many purposes, since in many cases an alternating voltage of high frequency is necessary. In addition, an alternating potential of high frequency may be transformed more easily and by means of smaller transformers than one of lower frequency. Moreover, it is an important factor that doubling the frequency of a machine doubles the output.

The annular surfaces of the rotor and stator are provided with radially extending teeth, which are spaced by a certain distance. The adjacent surfaces of the rotor and stator teeth may be parallel, the spacing of each pair of annuli or discs being maintained by interposed discs or rings of suitable diameter.

The interposed spacing rings may be provided with teeth in the same manner as the rotor and stator, so as to contribute also to the variations in capacity. The adjacent discs and annuli, which are arranged in the manner of the blades of steam turbines, may be provided with inclined lateral surfaces, so that in longitudinal section they present a triangular or trapezoidal form, as compared with an arrangement having parallel side surfaces of the teeth, such an arrangement has the advantage that no spacing discs are required, so that a larger number of toothed discs may be accommodated in a machine of given axial length.

The use of both side faces as well as the end faces of the teeth is a constructional feature assisting in obtaining the largest possible variations of capacity. The provision of the same number of teeth in the stator and in the rotor is made in order that the maximum or minimum capacity is supplied simultaneously by all teeth, and the greatest variations of capacity thus ensured when the machine is running. The value of the alternating current produced may also be increased by the use of a dielectric of high dielectric constant. For this purpose, for example, the teeth of either the rotor or the stator or both may be coated with a substance of dielectric constant higher than that of air at atmospheric pressure. In most cases greater voltage rating is simultaneously ensured so that a higher direct voltage can be applied to the machine. The same improvement may also be obtained by increasing the pressure of the air between the teeth, since dielectric constant increases with increase of pressure, and at the same time the break down voltage of the air is increased. Increase of the dielectric constant is equivalent to an increase of capacity, and the increase of the breakdown voltage permits of the use of higher voltages so that the two provisions assist one another in increasing the possible alternating current output obtainable. Instead of air other gases of higher dielectric constant than air may be employed. In this connection the heat conductivity of the gas must also be taken into account, since this is of importance in dissipating the heat produced. Increase of pressure also improves the cooling of the machine, owing to the conductivity of air increasing with pressure. For maintaining the pressure a storage tank may be provided, from which leakage losses of the compressed air or gas may be made up, or a small compressor may be operated during the operation of the machine to produce and maintain the pressure within the machine.

The shape of the teeth controls the wave form of the alternating voltage produced, so that, by suitable design of the teeth and gaps a sufficiently sinusoidal form of the alternating voltage or current may be ensured. Harmonics of the alternating voltage produced may be eliminated by electric means, so as to obtain the sinusoidal fundamental and, by the employment of electric filters these harmonics may be filtered for use for some further purpose.

It is desirable to make the tooth narrower than the tooth gap and at the same time to dispose the tooth sides and edges at an angle, so that the tooth and the gap are both of trapezoidal form. Preferably, sharp edge or corners and sudden changes of direction of the outer surfaces of the teeth and gaps are avoided.

Preferably, a reproduction method is used in the production of the teeth, for example the teeth may be produced by milling, possibly according to the generating method, or by pressing, casting or die-casting. With pressing, casting or die-casting, the discs or annuli may be formed simultaneously with the teeth in a single operation.

The effect of temperature variations is preferably eliminated or at least reduced to a minimum. The effect of temperature variations, if any, is to reduce the air gaps between the rotor and stator. This may be avoided by providing heat insulation at suitable points or by heat insulating all moving parts. By arranging for the measurement of the separation of the stator and rotor, or by subdividing these machine parts into individual units or machines suitably mounted the effect of heating may also be avoided, because the effect is smaller with smaller systems or machines. Another method of avoiding the effect of temperature variation consists in heating the machine, for example electrically, and maintaining the temperature constant by means of a thermostat. If temperature differences cannot be avoided the effect of non-uniform heating may be diminished by employing suitable materials, for example by making those parts which attain a higher temperature material of a lower coefficient of thermal expansion.

The value of the alternating current output of the machine may be increased by employing, according to a further feature of the invention, an impedance in the load circuit, said impedance being preferably inductive. It is advantageous to make the inductance of the load circuit and the maximum capacity of the machine resonate at the frequency produced. The impedance is preferably that of the load, which is connected to the machine either directly, i. e. galvanically, or by means of an inductive or capacitive coupling. If several machines according to the invention are operated in parallel, the inductance necessary to bring about resonance may be associated with each individual machine; this has the advantage that the resonances is obtained where the machines are used individually or in parallel. If the machines are insulated one from the other, parallel or series connection may be employed at will. In the former case the alternating currents of the various machines are added; in the latter case a substantially greater total voltage may be employed, depending on the series connection of the individual machines, so that an alternating current of higher voltage is obtained.

The machine may be employed with advantage for wireless telegraphy, telephony or television operating over wired or wireless circuits, or for industrial purposes, for example induction heating or melting of bodies, such as metals and in certain methods of working including pressing, rolling, drawing, compressing and the like. Food may also be heated in known manner by induction currents, and nonmetallic solutions, as in chemical processes, may be heated. In employing the machine for the purposes of telegraphy and telephony low frequency telegraphy or telephony currents may be modulated upon the high frequency currents produced by the machine. For this purpose an amplifying valve may receive input from the telegraphic or telephonic currents, or from other current or voltage variations, the valve varying the exciting direct voltage of the machine. Instead of effecting modulation by a valve, a variable resistance or transformer may be employed whereby a further voltage may be imposed upon the direct current circuit.

Instead of building up the rotor and stator of individual discs or rings, mechanically connected to form a rigid structure, an integral member may be used for the rotor or stator, in which case the toothed annuli are produced by milling from the solid. The teeth may be disposed in rows parallel to the axis. The casing is then made in two sections, split longitudinally of the machine.

Preferably a light metal of the necessary strength is employed for the rotor and stator. For machines of low peripheral speed, i. e. up to 250 m. per second, aluminium bronze (e. g. lautal), or duralumin or electron metal is suitable, provided it has a strength of 40 to 50 kg. per square mm. In the case of higher peripheral speeds the member carrying the teeth conveniently consists of rings or a hollow cylinder of steel of a strength of at least 50 kg. per square mm. The rings or the cylinder are pressed onto, or mounted on, a light metal core. The core need not then be solid but may be recessed to save weight and material. The mass of the rotating parts of the machine may be thereby considerably reduced so that the time taken to start and stop is considerably reduced. The same effect may be obtained by not making the rotor solid, whether it is built up of discs or formed integrally. Where the rotor is made by casting, considerable saving of weight and mass may be effected. Weight may also be saved by making the casing of light metal and/or by employing a stator as narrow as possible. When the stator is cast, considerable saving of weight and material may be effected by employing hollow teeth, which is possible since the stator is not subjected to any substantial mechanical stress.

Fig. 1a is a fragmentary cross-sectional view of a rotor and a stator of the machine according to my invention, Fig. 1b is a fragmentary section through the interengaging portions of the rotor and stator shown in Fig. 1a, said section being taken in a plane parallel to the axis of the rotor, Fig. 2a is a fragmentary cross-sectional view of a rotor and a stator of a machine according to another embodiment of my invention, Fig. 2b is a fragmentary view illustrating the angular form of the teeth of a rotor and a stator according to Fig. 2a, a portion of the rotor being broken away, Fig. 3 is a fragmentary section similar to that shown in Fig. 1b, in which, however, the teeth of the annular members of the rotor and stator are of angular form and the rotor teeth only are coated with an insulating layer, Fig. 4 is a diagrammatic view of a machine being subdivided into a plurality of separate units, Figs. 5a, 5b, 6a and 6b illustrate circuit arrangements of various applications of the invention, Fig. 7a is a fragmentary cross-sectional view of a rotor and a stator of a machine according to a further embodiment of the invention, Fig. 7b is a fragmentary section through the interengaging portions of the rotor and stator shown in Fig. 7a, said section being taken in a plane parallel to the axis of the rotor, Figs. 8a and 8b are fragmentary cross-sectional views of a rotor and a stator similar to that shown in Fig. 7a, in which, however, the teeth of the rotor and stator have different forms.

Figure 1a illustrates the manner in which the rotor and stator are built up of individual discs. The machine shaft is indicated at 1, and the rotor comprises circular, annular discs 2a to 2e of which discs 2b and 2d carry teeth at their outer periphery. The discs 2a, 2c and 2e serve to maintain correct spacing between the toothed discs 2b and 2d. The rotor discs are held together by a plurality of bolts or rivets 3 disposed round the periphery of the discs.

The stator also comprises separate parts consisting of flat rings 5a to 5e. The rings 5a, 5c and 5e are of a greater radial extent, so that the side surfaces thereof face the side surfaces of the toothed annular portions of the rotor discs 2b and 2d, the rings 5a, 5c and 5e entering the gaps between the rotor teeth. The stator discs are also held together by bolts or rivets 7.

The shape of the adjacent faces of the stator teeth on the rings 5a, 5c and 5e and of the teeth on the discs 2b and 2d are shown in the plan view of Figure 1b. The arrows upon the rotor portions indicate the direction of movement. In the relative position of rotor and stator shown in Figure 1b the capacity between the two is of its maximum value.

In the embodiment shown in Figure 1a the effective surfaces of the teeth of rotor and stator are coated at 4a, 4b, 4c, 4d, 4e and 6a, 6b, 6c, 6d, and 6e respectively with a substance which has a dielectric constant and a dielectric resistance higher than that of air.

In Figures 2a and 2b toothed annuli of triangular cross section are employed. In this arrangement the spacing discs 2a, 2c, 2e, and 5b and 5d of Figure 1a are unnecessary as such. In Figure 2a the same reference numerals are employed as in Figure 1a. The coating 4a, 4b, 4c, and 6a, 6b, 6c, 6d on the sides of the teeth is also shown.

The left hand side of Figure 2b illustrates the triangular form of the gaps and the prismatic form of the teeth of the stator, and the shape of the teeth and gaps of the rotor on the right hand side; the fixing screws or bolts are indicated at 3 and 7.

In Figure 3 is shown an arrangement, in which the rotor teeth 4 only are coated with an insulating layer 9. The gaps are triangular in cross section on both rotor 2 and stator 5 and the teeth are of prismatic form with an obtuse cornered front surface. The width of the front face of the teeth is less than the width gaps, so that the capacity is a minimum when a rotor tooth is in the mid-position opposite a gap.

Figure 4 illustrates the method of subdividing the machine into a plurality of separate units 10a, 10b and 10c. The composite machine is driven by a motor 19, and the individual units connected to the motor to each other by the clutches 21. The clutches and the mounting of the machine on the base plate 20 may be such that the machines are completely insulated from one another, so that the machines may be operated individually or in any desired combination in parallel or in series.

Figures 5 and 6 are circuit diagrams of various applications of the invention. In Figure 5a 11 indicates the source of direct current, 10 the machine with its varying capacity and 12 is an inductance load impedance. The coil 12 may be, for example, the coil of an induction furnace. The currents induced in conductors from this coil may be used to heat metals, conductive liquids and solutions, or metal vessels containing liquids to be heated. The value of the inductance 12 may be so related to the capacity 10 that at the frequency of the alternating voltage produced there is approximate or exact resonance. The coil 12 is directly connected to the load circuit of the machine 10.

In the diagram shown in Figure 5b direct current isolation between the machine circuit 10, 11, 12 and the load circuit 13, 14, 15 is obtained since the windings 12 and 13 constitute a transformer and are coupled magnetically only. In this manner the load circuit is completely separated from the direct current supply circuit for the machine. The secondary circuit 13, 14 and 15 may contain additional tuning means for setting the resonance, for example, the condenser 15 connected in series in the secondary circuit may be adjusted for this purpose. Alternatively to being connected in series with the coil 14, the condenser 15 may be connected in parallel thereto. For tuning the load circuit to resonance the secondary winding 13 may be adjusted, for example, by altering the number of turns or the coil 14 may be altered.

Resonance may also be obtained either by changing the frequency of the alternating voltage produced by the machine 10, or, if the machine consists of a plurality of individual units (which may be disposed in the same machine casing) by altering the machine capacity by cutting out individual units or parts or by connecting such units or parts in parallel or in series.

The diagrams shown in Figures 6a and 6b illustrate the application of the machine to high frequency telegraphy or telephony. The machine 10 on rotation produces a high frequency, upon which low frequency oscillations corresponding to a telegraph signal or to a microphone or telephone current are superimposed by means of a valve 18. The amplifying valve 18 is controlled in usual manner by variation of the grid potential, the alternating current flowing through a resistance R having a shunt condenser C. The employment of coupled coils 12 and 13 permits of direct current isolation of the load circuit 17, 15, 13, 16 and the machine circuit 11, 10, 12, 18. This arrangement permits of tuning in the primary circuit, i. e. in the machine circuit, and also in the secondary circuit, i. e. in the transmitting circuit.

A different circuit for the same purpose is shown in Figure 6b. The load circuit 17, 16 is not inductive in this case, and it is capacatively coupled to the machine circuit through condensers 15a and 15b. The condensers isolate the load circuit from the direct voltage of the machine supply and the condensers may be varied for tuning the transmitting circuit to resonance with the frequency of the machine alternating voltage produced.

In this arrangement also the signal current or telephone currents are superimposed on the direct current circuit of the machine by means of an amplifying valve 18.

In Figures 7a and 7b is shown a machine construction having stator and rotor teeth of substantially the same form as that shown in Figure 1a, but in which the rotor construction is different. In Figure 7a the rotor comprises a unitary member 2 secured to the rotor shaft 1. To this member is attached toothed rings which may be machined out of solid material, for example by milling or which may be cast integrally with the rotor member 2. The rotor member 2 may be formed of light metal with the toothed rings secured thereon by a key or by being shrunk onto the member 2. The teeth may be rectangular in cross section as shown in Figures 7a and 7b or, as shown in Figures 8a and 8b, they may be trapezoidal or triangular with either rounded or sharp edges. A development of a circular section through the rotor and stator teeth is of the form shown in Figure 7b in which the teeth 4a form part of the rotor and the teeth 6a part of the stator.

What I claim is:

A rotary machine for use in the production of alternating potential from a direct potential by periodically varying the capacity between rotor and stator, comprising a rotor and a stator, said rotor being provided with at least one disc-like member forming a capacity surface, said stator being provided with at least one disc-like member forming a capacity surface, said disc-like members of the rotor and the stator being provided with toothed annular portions at their lateral surfaces, the toothed annular portions of the rotor and the stator being disposed adjacent to each other and being constructed as conical surfaces with the axis of rotation coinciding with the axis of the rotor, and a dielectric arranged between the annular portions of the rotor and the stator.

JOSEPH MASSOLLE.